(12) United States Patent
Lee et al.

(10) Patent No.: US 6,510,996 B1
(45) Date of Patent: Jan. 28, 2003

(54) BAR CODE PRINTING METHOD FOR TIRE AND PRINTING EQUIPMENT THEREFOR

(75) Inventors: Ki Seong Lee, Choongchungnam-Do (KR); Ki Han Ko, Choongchungnam-Do (KR); Seung Wan An, Choongchungnam-Do (KR); Jong Hum Yeon, Choongchungnam-Do (KR)

(73) Assignee: Hankook Tire Co., Ltd., Seoul (KR)

( * ) Notice: Subject to any disclaimer, the term of this patent is extended or adjusted under 35 U.S.C. 154(b) by 0 days.

(21) Appl. No.: 09/453,948

(22) Filed: May 25, 2000

(30) Foreign Application Priority Data

Oct. 15, 1999 (KR) .............................. 99-44710

(51) Int. Cl.[7] ................................. G06K 7/10
(52) U.S. Cl. .................. 235/462.01; 235/385; 156/362
(58) Field of Search ................. 235/385, 487, 235/445, 462.01, 462.14; 156/361, 362, 363

(56) References Cited

U.S. PATENT DOCUMENTS

| 4,700,078 A | * | 10/1987 | Mizuno et al. | ............ 235/454 |
|---|---|---|---|---|
| 4,778,060 A | * | 10/1988 | Wessner, Jr. | ................ 209/3.3 |
| 4,941,522 A | * | 7/1990 | Skurai | ........................ 152/523 |
| 5,264,066 A | * | 11/1993 | Iundell | ........................ 156/361 |
| 5,527,407 A | * | 6/1996 | Gartland | ...................... 156/64 |
| 5,834,530 A | * | 11/1998 | Ramcke et al. | ............. 522/157 |
| 5,996,892 A | * | 12/1999 | Meadows | .............. 235/462.01 |
| 6,173,892 B1 | * | 2/2001 | Kimijima | ..................... 235/385 |

FOREIGN PATENT DOCUMENTS

EP          0522354    *  1/1993   ............. B07C/3/14

* cited by examiner

*Primary Examiner*—Thien M. Lee
*Assistant Examiner*—Daniel St. Cyr
(74) *Attorney, Agent, or Firm*—Finnegan, Henderson, Farabow, Garrett, & Dunner, L.L.P.

(57) ABSTRACT

A bar code printing method for a tire and printing equipment therefor in which the tire is moved in one direction, and the moving tire is sensed to be stopped at a predetermined position. Then, a bar code is printed on the tire while stopped at the predetermined position and thereafter, the bar code printed tire is moved in one direction to be withdrawn and the predetermined position. Thus, the manufacturing cost can be reduced and the productivity can be enhanced.

2 Claims, 2 Drawing Sheets

BAR CODE PRINTING METHOD FOR TIRE AND PRINTING EQUIPMENT THEREFOR

CROSS-REFERENCE TO RELATED APPLICATIONS

Not Applicable

STATEMENT REGARDING FEDERALLY SPONSORED RESEARCH

Not Applicable

REFERENCE TO A MICROFICHE APPENDIX

Not Applicable

BACKGROUND OF THE INVENTION

1. Description of Related Art

As is known well, since tires are manufactured in various types and sizes, bar code labels are used for easy sorting of tires according to their types and sizes.

Bar code labels are printed in various manners according to the information on tires such as type, sizes and the like. The information on the pertinent tires such as tire type, size, price and the like can be easily identified by scanning the bar code printed on the tire by means of a scanner.

Conventionally, however, since an operator must manually affix labels made of paper on which a bar code is printed, the labeling task is burdensome.

Also, the conventional routine labeling task requires many workers, which results in undesirable increase in the labor expenses.

2. Field of the Invention

The present invention relates to a method of printing a bar code onto a tire and a printing equipment therefor, and more particularly, to a bar code printing method for a tire, which can reduce the manufacturing cost by an automated process, and a printing equipment therefor.

SUMMARY OF THE INVENTION

To solve the above-described problems, it is an object of the present invention to provide a method for printing a bar code on a tire, which can reduce the manufacturing cost by printing the bar code directly onto the tire using an automated process, and a printing equipment therefor.

To accomplish the above object of the present invention, the present invention provides a bar code printing method for a tire, and the method comprising the steps of: moving the tire in one direction; sensing the moving tire and stopping the tire at a predetermined position; printing a bar code on the tire stopped at the predetermined position; and moving the tire in one direction to withdraw the tire from the predetermined position.

According to another aspect of the present invention, there is provided a bar code printing equipment for a tire, and the equipment comprising means for selectively carrying a tire in one direction, means for sensing the supply of the tire by the tire carrying means, means for stopping the tire at a predetermined position, and a controller for automatically controlling the respective means step by step.

BRIEF DESCRIPTION OF THE DRAWINGS

The above object and advantages of the present invention will become more apparent by describing in detail a preferred embodiment thereof with reference to the attached drawings in which.

DESCRIPTION OF THE PREFERRED EMBODIMENTS

A preferred embodiment of the present invention will now be described in detail with reference to the accompanying drawings.

Figure 1:
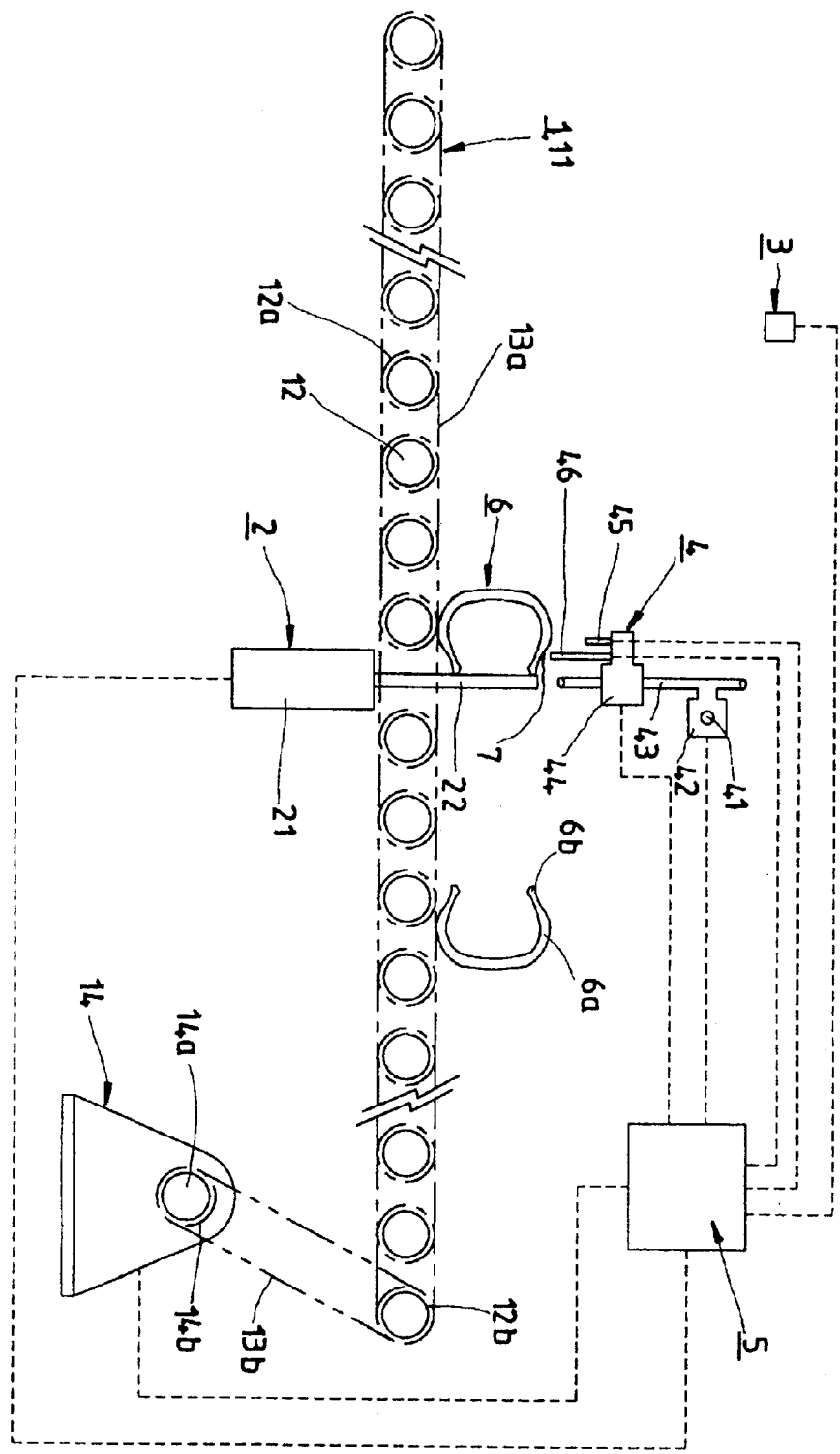
FIG. 1 is a front view schematically illustrating a bar code printing equipment according to the present invention.
Figure 2:
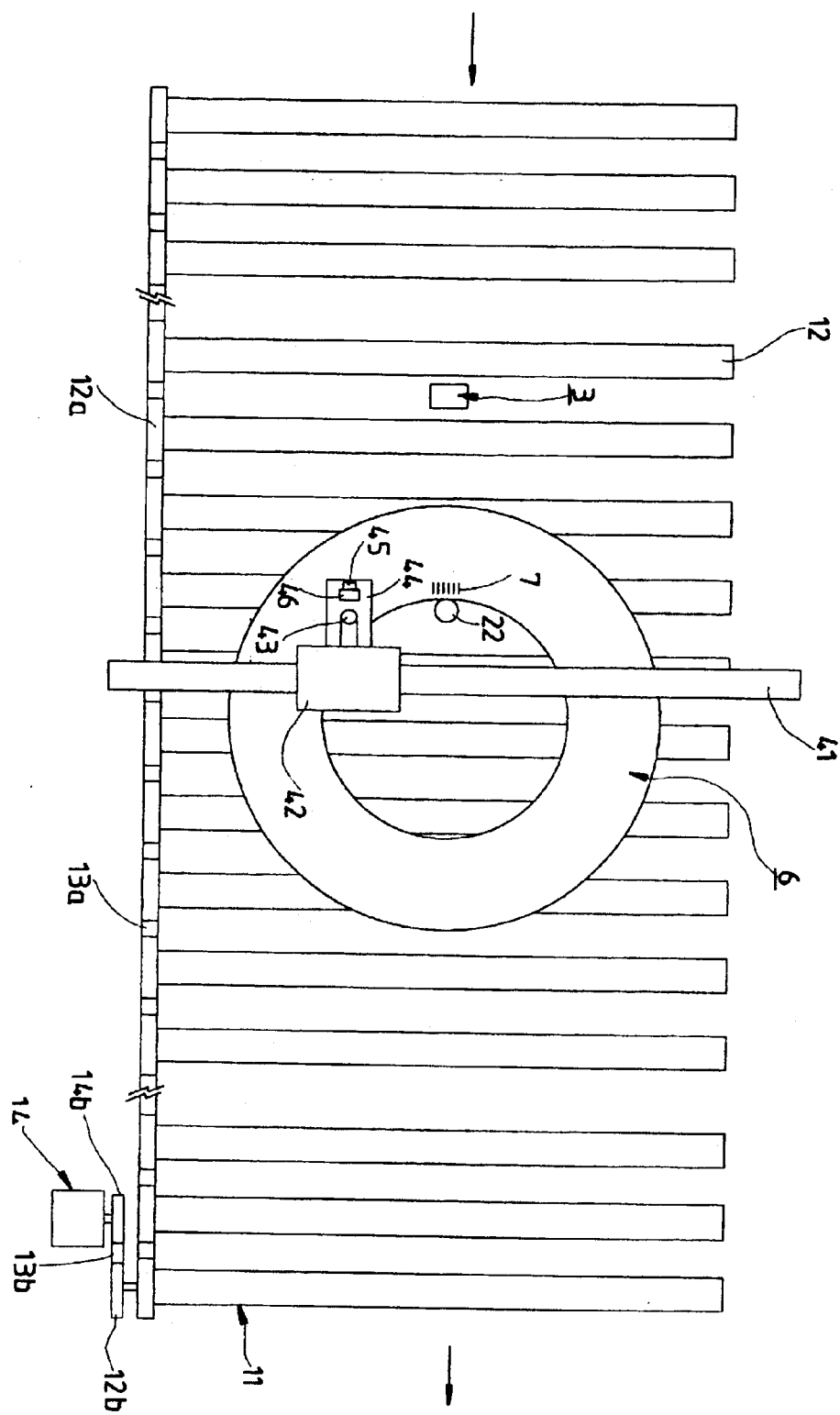
FIG. 2 is a plan view schematically illustrating the bar code printing equipment shown in FIG. 1.

Referring to FIGS. 1 and 2, a bar code printing equipment of the present invention includes a tire carrier 1 for carrying a tire 6 in one direction, a tire sensor 3 for sensing the supply of the tire 6 by the tire carrier 1, a tire stopper 2 for stopping the tire 6 at a predetermined position, a bar code printer 4 for printing a bar code on the tire 6 stationed at the predetermined position, and a controller 5 for automatically controlling the respective elements 1, 2, 3 and 4 step by step.

In this embodiment, a roll conveyor 11 operated by the controller 5 is used as the tire carrier 1. The tire stopper 2 includes a pneumatic cylinder 21 operated by the controller 5 and a stopper 22 fixed on a piston rod of the pneumatic cylinder 21. When the tire 6 is stopped, the stopper 22 protrudes into an inner hole of the tire 6 between rollers 12 of the roll conveyor 11 so that a bead 6b of the tire 6 is locked with the stopper 22. The roll conveyor 11 includes a plurality of rollers 12 connected to each other in a row by means of a chain 13a, and a driving motor 14 for driving the rollers 12. A chain gear 12a connected to the chain 13a is provided at one end of each roller 12. Another chain gear 14b is provided at one end of a motor shaft 14a of the driving motor 14, which is connected to the rollers 12 each having the chain gear 12b by means of a chain 13b and is operated by the controller 5.

In addition, the bar code printer 4 includes a horizontal guiding shaft 41, which crosses the traveling direction of the tire 6 at an angle of 90° and fixed to the upper portion of the tire carrier 1, a first carrier 42 movably fixed to the horizontal guiding shaft 41, driven by the controller 5 and selectively reciprocating along the horizontal guiding shaft 41, a vertical guiding shaft 43 fixed to the first carrier 42 and crossing the horizontal guiding shaft 41 at an angle of 90° so as to be disposed relative to the traveling direction of the tire 6 at an angle of 90°, a second carrier 44 movably fixed to the vertical guiding shaft 43, driven by the controller 5 and selectively reciprocating along the vertical guiding shaft 43, a distance sensor 45 for measuring the distance from the tire 6 to send a signal indicating the measured distance to the controller 5, and a spray nozzle 45 operated by the controller 5, for printing a bar code 7 on the tire 6.

The operation of the bar code printing equipment will now be described in detail in sequential steps.

First, the power of the driving motor 14 is sequentially transferred from the motor shaft 14a to the chain gear 14b, the chain 13b, the chain gear 12b, the roller 12, the chain 13a and then finally to the respective rollers 12. Thus, if the tire 6 is mounted on the roller 12 of the roll conveyor 11, the mounted tire 6 is transferred in advancing direction by the rotation of the parallel-arranged rollers 12.

Then, if the supply of the tire 6 is sensed by the tire sensor 3, the pneumatic cylinder 21 is operated at a predetermined time interval and the piston rod of the pneumatic cylinder 21 is extended. If the piston rod of the pneumatic cylinder 21 extends in such a manner, the stopper 22 fixed to the piston rod is then lifted between the rollers 12 to then protrude inside the tire 6 being transferred. In such a state, after the predetermined time interval, that is to say, after the bead 6b of the tire 6 is locked with the stopper 22 so that the tire 6 is placed at the predetermined position, the driving motor 14 of the roller conveyor 11 comes to a halt.

Thereafter, the second carrier 44 is driven so that the spray nozzle 46 is moved downward. If the spray nozzle 46 is placed at a predetermined distance apart from the tire 6, the second carrier 44 stops. At this point, the distance between the tire 6 and the spray nozzle 46 is measured by the distance sensor 46.

As described above, when the spray nozzle 46 is placed at a predetermined distance apart from the tire 6, the first carrier 42 is driven so that the spray nozzle 46 is horizontally moved along the horizontal guiding shaft 41 to be operated, thereby printing the bar code 7 on the tire 6. Here, the bar code printing position of the tire 6 may be any area of a sidewall 6a of the tire 6. Preferably, as shown in FIGS. 1 and 2, the bar code 7 is printed on the sidewall 6a around the bead 6b. Since the tire 6 is black, the printing solution is preferably white. According to the present invention, since the bar code 7 is directly printed on the tire 6, labels made of paper are not necessary, which remarkably reduces the cost required for affixing bar codes on tires.

If the bar code printer 4 completes the printing procedure, the first and second carriers 42 and 44 are driven in a reverse direction so that the spray nozzle 46 is restored to its initial position. Thereafter, or simultaneously, the pneumatic cylinder 21 is also operated in a reverse direction so that the stopper 22 is moved below the rollers 12.

Then, the driving motor 14 is driven again to withdraw the tire 6 from the predetermined position.

In the operation of the above-described bar code printing equipment, a method for printing a bar code on a tire according to the present invention includes the steps of moving the tire 6 in one direction, sensing the moving tire 6 and stopping the tire 6 at a predetermined position, printing the bar code 7 on the tire 6 stationed at the predetermined position and moving the tire 6 in one direction to withdraw the same from the predetermined position.

As described above, according to the present invention, a bar code is directly printed onto a tire by means of an automatically controlled bar code printing equipment. The bar code printing process is automated, thereby reducing labor expenses. Also, the cost for affixing the bar code onto a tire is remarkably reduced compared to the conventional art. Therefore, according to the present invention, the manufacturing cost can be greatly reduced and the productivity can be enhanced.

Although the invention has been described with reference to a particular embodiment, it will be apparent to one of ordinary skill in the art that various changes and modifications can be made without departing from the spirit and scope of the invention as claimed hereinafter.

Deposit of Computer Program Listings not applicable

What is claimed is:

1. A bar code printing apparatus for a tire having a bead around an open central region, comprising:

means for selectively carrying the tire in one direction, said tire carrying means including a roll conveyor;

means for sensing a supply of the tire by said tire carrying means;

means for stopping said tire at a predetermined position, said tire stopping means including a pneumatic cylinder and a stopper fixed on a piston rod of said pneumatic cylinder, wherein said stopper protrudes into the open central region of the tire between rollers of said roll conveyor, and the bead of the tire is caught against said stopper;

means for printing a bar code on the tire stopped at said predetermined position; and a controller for automatically and consecutively controlling said means for carrying, said means for sensing, said means for stopping, and said means for printing.

2. The bar code printing apparatus according to claim 1, wherein said bar code printing means includes a horizontal guiding shaft crossing the traveling direction of said tire at an angle of 90° and fixed to the upper portion of said tire carrying means; a first carrier movably fixed to said horizontal guiding shaft, driven by said controller, and selectively reciprocable along said horizontal guiding shaft; a vertical guiding shaft fixed to said first carrier and crossing said horizontal guiding shaft at an angle of 90° so as to be disposed relative to the traveling direction of said tire at an angle of 90°; a second carrier movably fixed to said vertical guiding shaft, driven by said controller, and selectively reciprocable along said vertical guiding shaft; a distance sensor for measuring the distance from said tire and outputting a signal indicating the measured distance to said controller; and wherein said means for printing a bar code on said tire comprises a spray nozzle operated by said controller.

* * * * *